United States Patent [19]

Notarianni et al.

[11] Patent Number: 5,598,543
[45] Date of Patent: Jan. 28, 1997

[54] METHOD OF INTERFACING BETWEEN DATA TRANSMISSION SYSTEMS HAVING AN UNEQUAL NUMBER OF TRANSCEIVER PORTS

[75] Inventors: John Notarianni, 135 Midway St., Babylon, N.Y. 11702; Yuwa Chan, Long Island City, N.Y.

[73] Assignee: John Notarianni, Babylon, N.Y.

[21] Appl. No.: 313,857

[22] Filed: Sep. 26, 1994

[51] Int. Cl.⁶ .................................................. G06F 13/00
[52] U.S. Cl. ...................... 395/309; 395/200.09; 370/473
[58] Field of Search ......................... 395/200.01–200.21, 395/309

[56] References Cited

U.S. PATENT DOCUMENTS

| | | | |
|---|---|---|---|
| 4,058,672 | 11/1977 | Crager et al. | 358/407 |
| 4,847,900 | 7/1989 | Wakim | 379/424 |
| 4,882,747 | 11/1989 | Williams | 379/102 |
| 5,075,792 | 12/1991 | Brown et al. | 359/152 |
| 5,313,051 | 5/1994 | Brigida et al. | 235/375 |
| 5,343,319 | 8/1994 | Moore | 359/152 |
| 5,417,222 | 5/1995 | Dempsey et al. | 128/696 |

*Primary Examiner*—Jack B. Harvey
*Assistant Examiner*—Sumati Lefkowitz
*Attorney, Agent, or Firm*—Hoffmann & Baron

[57] ABSTRACT

A method of interfacing between data transmission systems having an unequal number of transceiver ports includes generating an information signal within a first data transmission system and compressing the information signal to provide a data packet signal and a control packet signal which are transmitted to an interface mechanism. The interface mechanism decompresses the data packet signal and control packet signal to provide a data information signal and control information signal which are separated. The control information signal is then converted to a signal format which is compatible with the transceiver ports of the second data transmission system. Thereafter, both the data information signal and converted control information signal are provided to the transceiver input port of the second data transmission system.

23 Claims, 5 Drawing Sheets

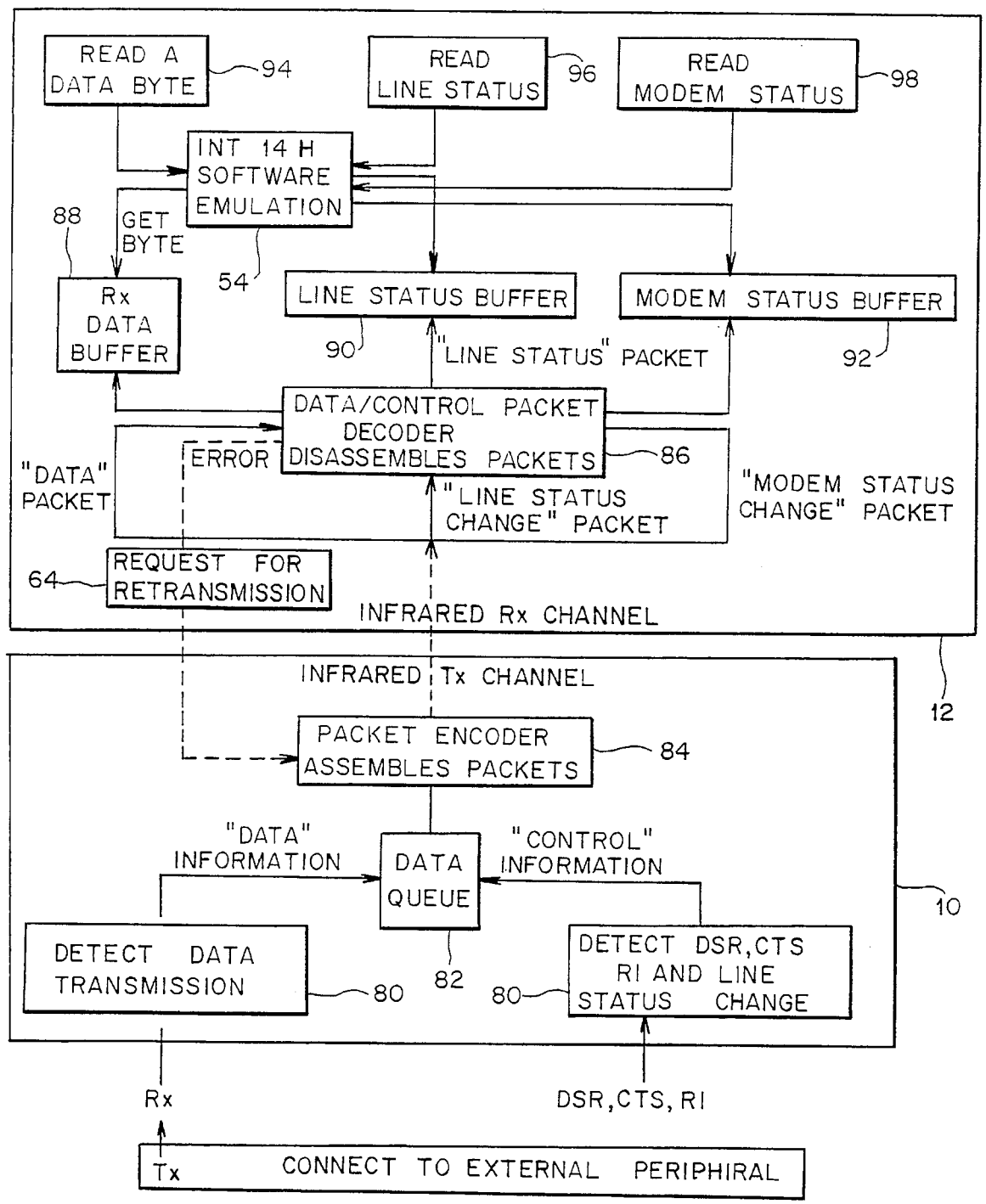

FIG. 6

ASCII CONTROL CODES (Hex)

| | |
|---|---|
| SOH | 01H |
| STX | 02H |
| ETX | 03H |
| EOT | 04H |
| ENG | 05H |
| ACK | 06H |
| DLE | 10H |
| NAK | 15H |
| SYN | 16H |
| ETB | 17H |
| CAN | 18H |
| SUB | 1AH |
| ESC | 1BH |
| XON | 11H |
| XOFF | 13H |

DATA FLOW CONTROLS

BUFFER LOW WATER MARK: [DLE][XON]

BUFFER HIGH WATER MARK: [DLE][XOFF]

THE XON/XOFF MESSAGES PREVENT RECEIVE BUFFER OVERFLOW BY SIGNALING THE OTHER PARTY THE BUFFER STATUS

ACKNOWLEDGEMENT OF PACKET:
    [ACK][BLOCK NO.]
        1 BYTE

PACKET ERROR [NAK][BLOCK NO.]
        1 BYTE

CONNECTION PRESENCE INDICATOR SYN

SYN IS BEING SENT EVERY SO OFTEN TO INDICATE THE PRESENCE OF THE PHYSICAL CONNECTION

DATA PACKET STRUCTURE:
[DLE][STX][BLOCK NUMBER][DATA BLOCK][DLE][ETX][CRC-CCITT 16 BIT CHECKSUM]
              1 BYTE   UP TO 3K                      2 BYTES

CONTROL PACKET STRUCTURE:
[DLE][SON][MESSAGE TYPE][W/MESSAGE DATA][DLE][ETX][CRC-CCITT 16 BIT CHECKSUM]
        1 BYTE    SIZE DEPENDS
                  UPON MESSAGE TYPE

OUT OF BAND MESSAGE (MAY BE EMBEDDED WITHIN DATA BLOCK):
[DLE][ESC][MESSAGE TYPE][MESSAGE DATA]

METHOD OF INTERFACING BETWEEN DATA TRANSMISSION SYSTEMS HAVING AN UNEQUAL NUMBER OF TRANSCEIVER PORTS

BACKGROUND OF THE INVENTION

1. Field of the Invention

The present invention relates to a method of communication to and from a portable computer, and more particularly relates to a method of interfacing between a portable computer and a peripheral which have an unequal numbers of transceiver ports.

2. Description of the Prior Art

Pen-based computers, which are commonly referred to as electronic clipboards, have become increasingly popular forms of portable computers. Such computers basically include a liquid crystal display and an integral tethered pen for hand-written input of information on the display. The pen-based computer may be programmed to display a form with blanks provided for completion by the user who provides appropriate information. Such pen-based computers are particularly adapted for use by non-technically oriented personnel, as the user merely has to follow the form displayed on the computer screen. Pen based computers are commonly used by utility meter readers, by the workers in power plants or manufacturing facilities where gauges may have to be periodically monitored and their readings recorded, and by package delivery company workers.

The information provided by the user to the pen-based computer is retained in the computer memory until the data is transferred to a main computer for analysis, display and storage. Typically, the pen-based computer includes light emitting diodes which form part of an opto-electronic data transmission device that permits the optical transmission of signals between the pen-based computer and the main computer. The data transmission is preferably performed by an opto-electronic device because it is substantially more easy to couple an opto-electronic transmitter and receiver than it is to couple traditional computes connectors and because the daily connection and detachment of the pen-based computer to traditional connectors ultimately leads to the failure of the traditional connector device within a relatively short period of time. Therefore, incomplete and incorrect transmission of data may occur if the connector fault is not timely noticed. Additionally, opto-electronic data transmission is preferred in connection with pen-based computers because it tends to be a faster method of communication than that accomplished by traditional connectors.

The opto-electric data transmission device of the pen-based computer ordinarily provides for both data transmission and reception so that two-way communication can be established between the pen-based computer and the devices to which it is coupled. However, the opto-electric data transmission of information to and from the pen-based computer is not compatible with many computer peripherals that are not specifically adapted for use with the pen-based computer opto-electronic data transmission scheme.

OBJECTS AND SUMMARY OF THE INVENTION

It is an object of the present invention to provide an efficient method for transferring data between a pen-based computer and a computer peripheral.

It is another object of the present invention to provide a method for transferring information between a portable computer and a computer peripheral having an unequal number of transceiver ports.

It is yet another object of the present invention to provide a method for the efficient and error-free transfer of information between a portable computer which transfers data via an opto-electronic device and a computer peripheral which includes only a standard computer connector.

It is a further object of the present invention to provide a method for the transfer of information between data transmission systems which overcomes the disadvantages of known interface methods.

In accordance with one form of the present invention, the method for interfacing between a first data transmission system and a second data transmission system utilizing an interface mechanism includes generating an information signal including at least one of a data signal and a control signal within the first data transmission system. The data signal represents data to be transferred from the first data transmission system to the second data transmission system. The control signal represents control commands and status commands to be provided by the first data transmission system to the second data transmission system.

The data signal is monitored to determine whether it is at least equal to a preset data packet signal size. If the data signal is less than the preset data packet signal size, a second data signal is combined with the first data signal to provide the data signal. The method includes compressing the at least one of a data signal and control signal within the first data transmission system to provide at least one of a first data packet signal and a control packet signal.

The method further includes providing the data packet signal and control packet signal to a packet output scheduler for transmission to an interface mechanism via the respective transmit and receive channels. The data packet signal and control packet signal include a checksum signal which is also provided to the interface mechanism. The interface mechanism compares the checksum signal to the data packet signal and control packet signal to determine whether an error-free signal transfer was accomplished. If there was no transmission error, the data packet signal and control packet signals are decompressed in a packet decoder of the interface mechanism to provide data information signals and a control information signals. The data information signals are separated from the control information signals and thereafter the control information signals are converted to a format which is compatible with the connector utilized as the input port of the second data transmission system. Finally, the data information system and converted control information signal are provided to the second data transmission system through that systems connector.

In an alternative method of the present invention of interfacing between a first data transmission system and a second data transmission system utilizing an interface mechanism, the method includes providing an information signal from the second data transmission system to the interface mechanism. The information signal includes at least one of a data information signal, a control information signal and line status signal. The information signal is compressed within the interface mechanism to provide an information packet signal which conforms with the type of signal transmission and reception utilized between the interface mechanism and the first data transmission system. The information packet signal is thereafter transmitted from the interface mechanism to the first data transmission system.

The information packet signal includes a checksum signal which is also provided to the interface mechanism. The interface mechanism compares the checksum signal to the information packet signal received from the interface mechanism to determine whether an error-free signal transfer was accomplished.

The method further includes decompressing the information packet signal to provide at least one of a data information signal, a control information signal and a line status signal. The data information signal is provided to a data buffer, the control information signal is provided to a modem status buffer and the line status signal is provided to a line status buffer. These buffers can thereafter be accessed by the first data transmission system when requested.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a flow diagram illustrating a second method of the present invention.

FIG. 6 is a chart illustrating the packet structures utilized for encoding and decoding in the method of the present invention.

DETAILED DESCRIPTION OF THE PREFERRED EMBODIMENTS

Figure 1:
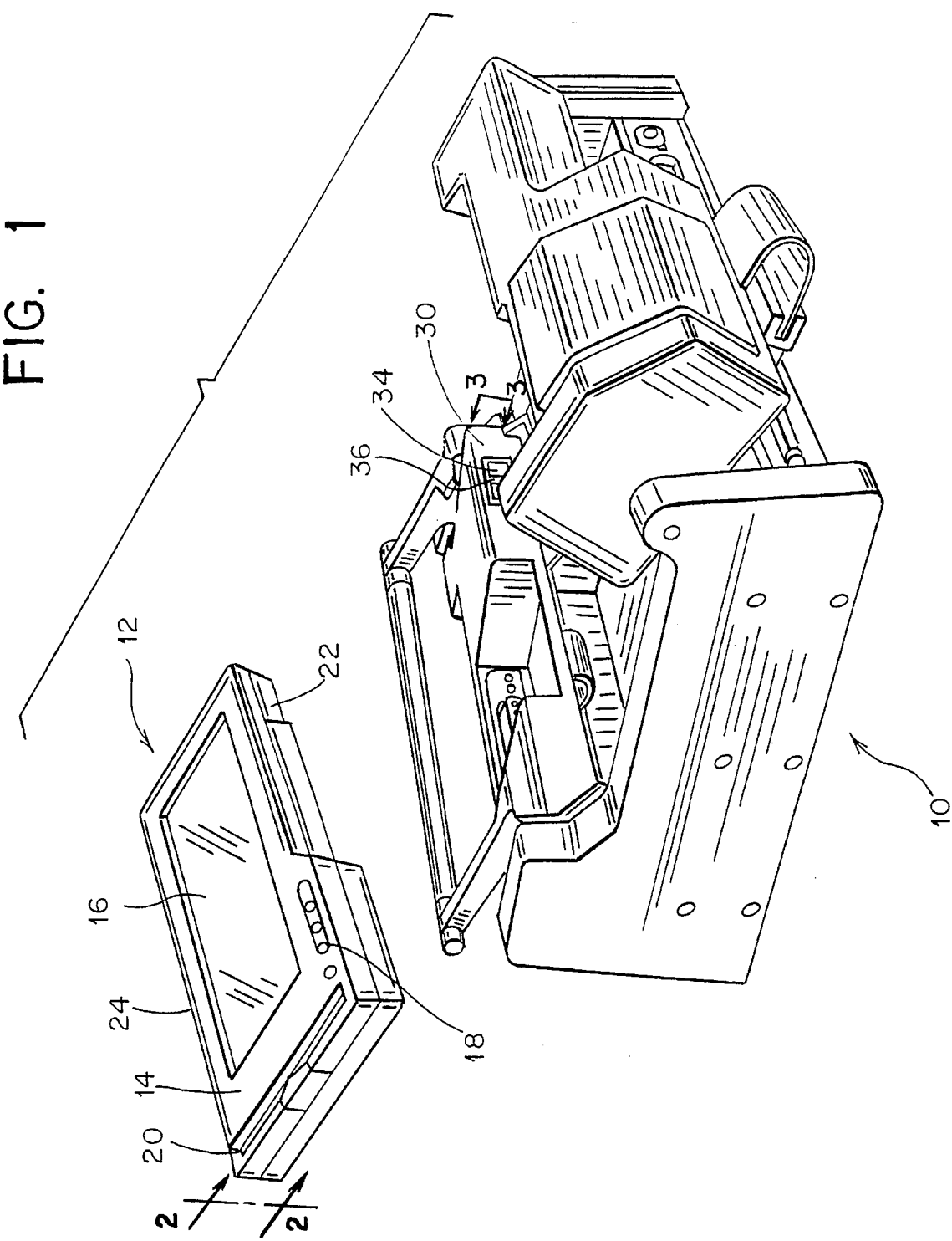
FIG. 1 is a partially exploded perspective view of a pen-based computer and a computer receptacle unit for carrying out the method of the present invention.

Referring now to FIG. 1, the present invention provides a method of communication between a pen-based portable computer 12 which receives and transmits data opto-electrically, and computer peripherals which transmit and receive data via traditional computer connectors. Previously, communication between the aforementioned devices was not readily available because the two transmit/receive ports of the traditional opto-electronic device (infra-red device) are not compatible with the traditional RS232-C Serial 9-Pin connector utilized by most computer peripherals.

While the method of the present invention finds particular utility in the interconnection of a pen-based portable computer with computer peripherals, it may be appreciated that the concepts of the present invention may be employed in a variety of situations where a first data transmission system has an unequal number of transceiver ports as compared to a second data transmission system to which the first system would like to communicate.

The pen-based portable computer 12 is typically provided to a mobile receptacle unit 10 which may be mounted in a service vehicle (not shown, typically a truck or delivery van). The mobile receptacle unit 10 is constructed to interface and permit two-way data communication between the pen-based computer 12 and a computer peripheral such as a printer (not shown) or a mainframe computer (not shown), typically located at the company office.

Mobile computer receptacle unit 10 is constructed to insertably accommodate pen-based portable computer 12 which may be a commercially available device. In the present illustrative example, the particular pen-based computer shown is a computer manufactured by Fujitsu America, Inc. of San Jose, Calif. under the trademark PoquetPad Plus. Computer receptacle unit 10 is typically specifically constructed to accommodate the Fujitsu computer 12. However, as may be appreciated, receptacle unit 10 may be constructed in a manner to accommodate other types of pen-based computers.

The pen-based computer 12 is generally a rectangular member having an upper surface 14 which includes a liquid crystal display screen 16 permitting data display and data entry thereon. In a manner which is well known in the pen-based computer field, the pen-based computer 12 may be programmed to display a form or a chart with blanks provided for completion by the user who then writes the information in appropriate places on the display screen. Upper surface 14 also includes function keys 18 such as a power switch and brightness control. An unlighted pen (not shown) may be tethered to computer 12. A pen receiving trough 20 adjacent screen 16 provides for storage of the pen.

Pen-based computers are particularly adapted for use by non-technically trained personnel, as the user merely has to follow the form or instructions which appear on the computer screen 16. At an appropriate time, the stored data can then be down-loaded to a mainframe computer at a remote location such as the company office. This is normally accomplished at the end of each day by "docking" the computer 12 with the mainframe computer. At that time, information pertaining to the next day's service calls can also be transmitted to the pen-based computer 12 for use during the next service day.

Figure 2:
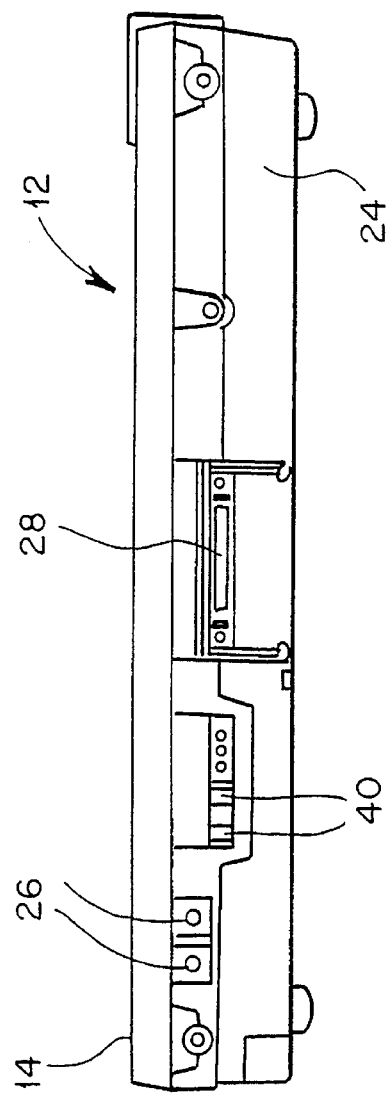
FIG. 2 is a view of one side of the pen-based portable computer shown in FIG. 1 taken along lines 2—2.
Figure 3:
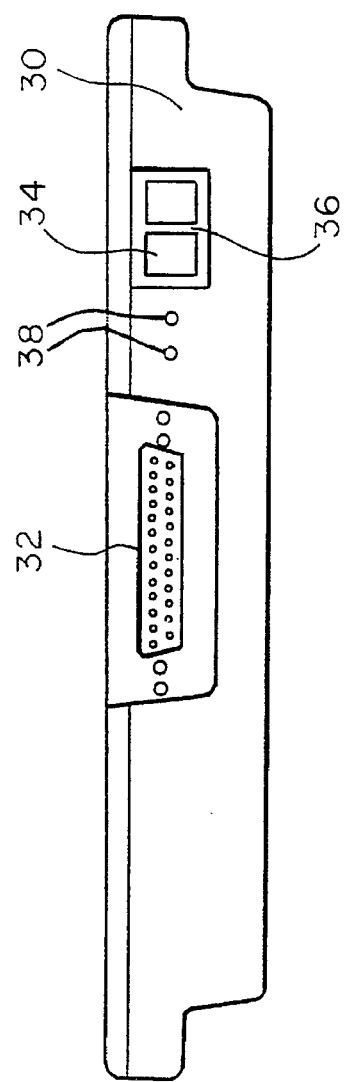
FIG. 3 is a view of a portion of the computer receptacle unit shown in FIG. 1 taken along lines 3—3.

Referring additionally to FIG. 2, in order to permit communication with the computer mainframe, the pen-based computer 12 includes a pair of opposed side surfaces 22 and 24 which have thereon a variety of electrical connection ports. Side surface 24 includes a pair of data transmission devices 26. As shown in the figure, data transmission devices 26 may include light emitting (infrared) diodes which form part of an opto-electronic device that permits the optical transmission of signals to and from computer 12. Data transmission devices 26 provide for data transmission and reception employing both an emitter and a detector so that two-way communication can be established to and from computer 12 as known in the art and as described in U.S. Ser. No. 08/177,629 filed Dec. 30, 1993 entitled Data Transmission Receptacle For Pen-Based Computers commonly assigned to CAD Forms Technology, now abandoned, and U.S. Ser. No. 08/150,393 filed Nov. 10, 1993 entitled Method and Apparatus for Transferring Data Between a Host Device and a Plurality of Portable Computers, also commonly assigned to CAD Forms Technology, the entire disclosure of each of which is incorporated herein by reference.

In order to permit communication between the computer 12 and the mainframe computer when a technician is "out on the road", the mobile computer receptacle unit 10 is employed. The computer receptacle unit 10 provides for the removable insertion of computer 12. After providing information into the pen-based computer at a given location, the user inserts the pen-based computer into the computer receptacle unit 10 as known in the art. The computer receptacle unit 10 then transfers the information remotely to the mainframe computer. Cellular technology may be employed to effect such data transmission. While docked in unit 10, computer 12 can also receive data transmitted from the mainframe computer for use by the service person during the day. Data input can also be effected while computer 12 is docked in unit 10. Such data may be instantaneously transmitted to the mainframe computer.

The computer receptacle unit 10 also includes an array of electronic components (not shown) which are designed to work in conjunction with the pen-based computer 12 when it is received by unit 10 to permit the pen-based computer to communicate with the mainframe computer and other devices. The array of electronic components may include a computer modem as well as electronics allowing two-way cellular communication so as to permit such remote signal transmission. In addition, the electronic array also provides for feed-through access to various peripheral functions of computer 12.

In order to maintain pen-based computer 12 in a "docked" position and to further provide electrical connection between computer receptacle unit 10 and pen-based computer 12, unit 10 includes computer engaging surface 30 which is positioned for engagement with side surface 24 of the pen-based computer 12 when the computer is docked in the unit. Computer engaging surface 30 may include an electrical connector 32 which is constructed for electrical engagement with connector 28 of computer 12. Additionally, computer engaging surface 30 includes a pair of optical transmission devices 34 which may include an emitter and detector designed for opto-electric engagement with the emitter and detector of data transmission devices 26 of computer 12. The close alignment of data transmission device 34 with data transmission device 26 establishes two-way data transmission capability between pen-based computer 12 and computer receptacle unit 10.

As previously mentioned, optical communication is desired between data transmission devices 26 of computer 12 and data transmission devices 34, because the data transfer tends to be faster and more accurate than traditional methods. Optical communication is also preferred because standard connectors tend to weaken, break and fail after repeated insertion and removal of the pen-based portable computer 12 with the computer receptacle unit 10. A sponge rubber shield 36 is provided around the perimeter of transmission devices 34 to shield extraneous light from the optical interface. Sponge rubber shield 36 also serves as a mechanical buffer between side surface 24 of pen-based computer 12 and computer engaging surface 30. Computer engaging surface 30 further includes a pair of spring retractable power contact pins 38. Contact pins 38 extend for spring engagement with power contact pads 40 of pen-based computer 12 upon near engagement of computer engaging surface 30 with side surface 24. Power contact pins 38 are preferably spring loaded to provide secure frictional mechanical and electrical engagement with contact pads 40.

Figure 4:
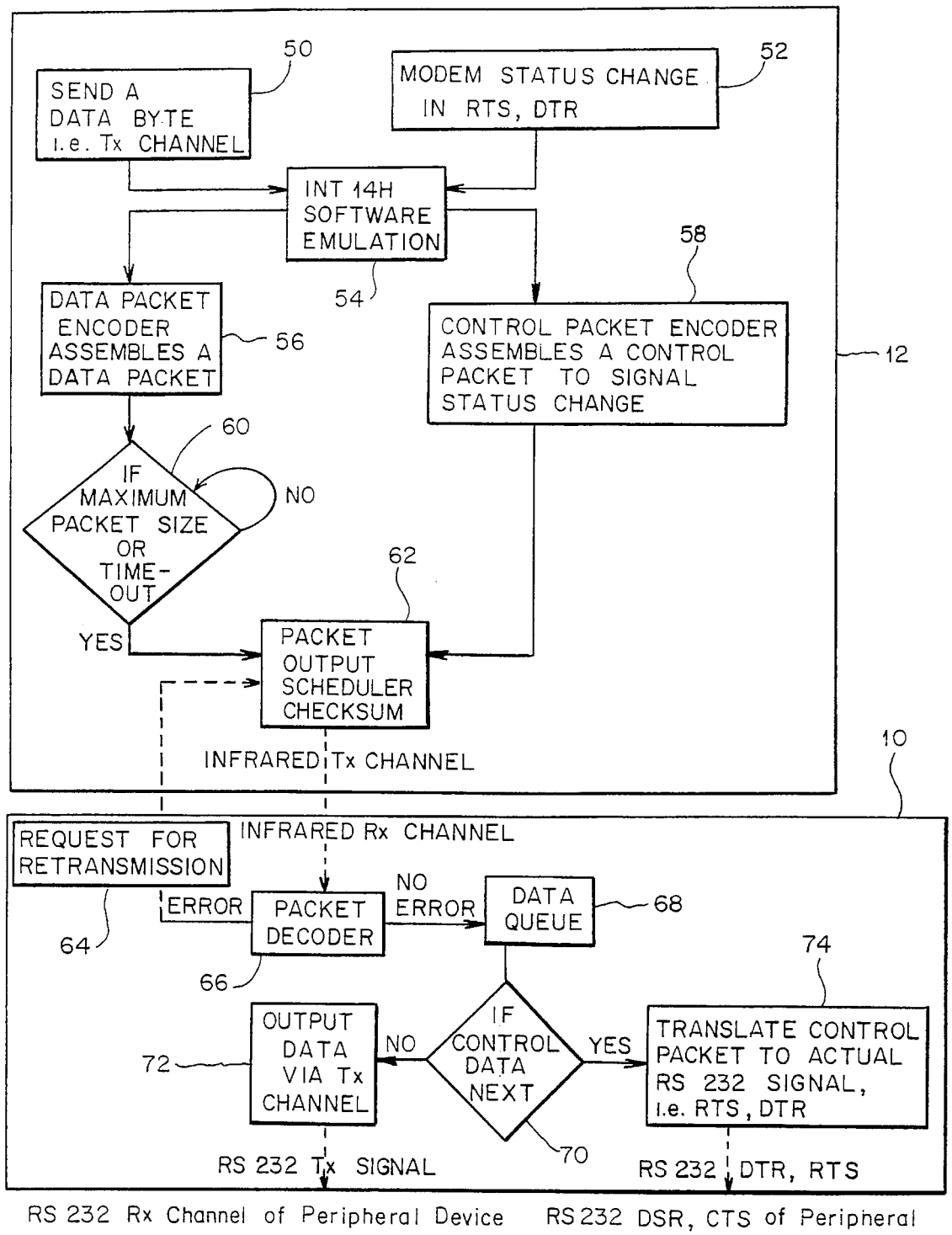
FIG. 4 is a flow diagram illustrating a first method of the present invention.

Referring now to FIGS. 4 and 5, the method of providing error-free data transmission between the pen-based computer 12, which transmits and receives data via opto-electrical ports, and a computer peripheral, which transmits and receives data via standard computer cable connector (such as the RS232-C Serial 9-Pin connector) will now be described. The method of transmitting data from the pen-based computer to the computer peripheral is shown in the flow diagram of FIG. 4.

The method of the present invention includes generating a data byte 50 within the pen-based computer 12 which is desired to be ultimately provided to the computer peripheral. Alternatively, a modem status change signal 52 may be generated for transmission to the peripheral. As is known in the art, the pen-based computer includes an INT 14H controlling routine 54 which accesses appropriate subroutines in order to execute the commands generated in the pen-based computer. In order to execute the method of the invention, the standard INT 14H system interrupt is modified so that particular execution commands are controlled by the method of the invention. This type of interruption of the system interrupt 14H is known and commonly utilized in the art.

Once the command to provide a data signal to the computer peripheral is received, these signals relating to data and control signals are separated. The data signals are assembled or compressed into data packet signals in a data packet encoder 56. Similarly, the control signals are assembled or compressed to provide control packet signals in a control packet encoder 58. The control packet signals are indicative of a status change in one of the seven (7) standard status signals utilized in RS232-C connectors. The seven (7) standard status change signals include CD (Carrier Detect), DTR (Data Terminal Ready), GND (Signal Ground), DSR (Data Set Ready), RTS (Request to Send), CTS (Clear to Send), and RI/+5V (Ring Indicator/+5V). The data packet signals and control packet signals generated by the data packet encoder and control packet encoder are a modified form of the IBM BISYNC ENCODING method known in the art. Specifically, the encoding and decoding (compression/decompression) is accomplished in accordance with the packet structures identified in FIG. 6.

Before a data packet signal is generated, the data signal is examined 60 to determine whether the data byte contains sufficient information to warrant compression into a data packet signal for transmission. Typically, if a data signal has less than 1K of information, the data signal is maintained in a buffer for the purposes of combining this signal with a second data signal so as to efficiently transfer data. While the first data signal is maintained in a buffer, a timer is initiated to determine how long the first data signal has been stored in the buffer. If a second data signal is not provided to the buffer for combination with the first data signal before a maximum data signal storage time is achieved, then the first data signal is compressed into a data packet signal and transferred from the buffer to a packet output scheduler 62. Otherwise, if the time-out is not reached, the first data signal is combined with subsequent data signals in an effort to reach the 1K limit. Once the 1K limit is realized, the combined data signals are compressed and provided to the packet output scheduler. The 1K limit can be changed based upon the requirements of the method.

With regard to the control packet signal, these signals have priority over the data packet signals and therefore are provided directly to the packet output scheduler once the control packet signals are generated.

The packet output scheduler 62 is connected to an infrared transmitter of the pen-based computer 12. After receiving the control packet signal and data packet signal, the packet scheduler determines whether the data packet signals and control packet signal can be sent to the computer receptacle unit. The packet output scheduler does this by continuously sending infrared signals indicative of the pen-based computer's readiness to send the signals to the computer receptacle unit 10. In a preferred embodiment of the present invention, the computer receptacle unit will transmit an infrared signal in response to the pen-based computer infrared signal. The computer receptacle unit infrared signal instructs the packet output scheduler to send the control packet signal and data packet signal that are ready for transmission. Thereafter these signals are sent by the infrared transmitter of the pen-based computer and received by the infrared receiver of the computer receptacle unit.

In addition to generating the data packet signals, the packet output scheduler 62 of the pen-based computer also generates a checksum signal which accompanies the control packet signal and data packet signal. As is known in the art, the checksum signal is indicative of the characteristics of the control and data packet signals. The checksum signal is transmitted with the control and data packet signals via the infrared transmitter of the pen-based computer. The infrared receiver of the computer receptacle unit receives the control packet signal and the data packet signal including the checksum signal. The control and data packet signals received by the computer receptacle unit are analyzed and an error signal is generated by the computer receptacle unit. As is known in the art, the computer receptacle unit compares the checksum signal with the error signal it has just generated. If the checksum signal and error signal are equivalent, then a proper data and control packet signal transmission was achieved. However, if the checksum signal and error signal are not equal, then the computer receptacle unit transmits a request 64 to the pen-based computer asking that the signals which were just sent, be retransmitted because all of the information was not transmitted in an error-free manner.

Once the control packet signal and data packet signal have been transmitted in an error-free manner, these signals are decompressed in a packet decoder 66 to conform with the RS232 Serial 9-Pin configuration to provide a data information signal and a plurality of control information signals. The data packet signal and plurality of control information signals are temporarily stored in a buffer 68 and then separated 70. The data information signal is then transmitted via the transmit data line (TXD) 72 of the RS232 configuration. Likewise, the control information signals are provided on respective channels of the RS232 connector configuration such that the request to send signal is provided on the RTS line and the data terminal ready signal is sent on the DTR line of the RS232 connector 74. These signals are transmitted via their respective channels through the connector to the computer peripheral and the data and control signals received by the computer peripheral can be acted on.

Referring now to FIG. 5, the method of the present invention of transmitting signals generated by a computer peripheral to a pen-based computer 12 will now be described. In a preferred embodiment of the present invention, the method includes providing an information signal from the computer peripheral via an RS232-C Serial 9-Pin connector. The information signal, including data transmitted on the TXD channel and control and line status provided on the DSR, CTS and RI channels are provided to the computer receptacle unit through its corresponding RS232-C connector 80. The information signal which includes a data information signal, a control information signal and a line status signal are provided to a buffer 82 for temporary storage of the received information signal. The information signal is then provided to a packet encoder 84 which assembles an information packet signal for transmission by the infrared transmitter of the computer receptacle unit 10.

The computer receptacle unit 10 transmits the information packet signal via the transmit channel (Tx) of the infrared transmitter. In addition to compressing the channels of the information signal for transmission on a single infrared channel, the packet encoder also generates a checksum signal which is incorporated into the information packet signal as is known in the art. The information packet signal along with the checksum signal is provided to the receive channel of the infrared detector of the pen-based computer.

Similar to that explained in connection with FIG. 4, the data/control decoder 86 of the pen-based computer 12 receives the information packet signal and creates an error signal which is compared to the checksum signal provided with the information packet signal. If the checksum signal and the error signal are equivalent, then an error-free transmission was realized. However, if the error signal is not equivalent to the checksum signal, then the pen-based computer provides a request on its infrared transmit channel (Tx) for retransmission of the information packet signal. Once the information packet signal has been received in error-free manner, the data/control decoder 86 of the pen-based computer decompresses or disassembles the information packet signal into its component portions. Specifically, the information packet signal is disassembled to provide a data information signal, a control information signal and a line status signal.

Each of the data information signal, control information signal and line status signal is provided to a respective buffer. Specifically, the data information signal is provided to a data signal buffer 88 for storage therein. The line status signal is provided to a line status buffer 90 for storage therein. The line status signal is indicative of whether there was an overrun error or framing error during transmission from the computer peripheral to the computer receptacle unit 10. Finally, the control information signal is provided to a modem status buffer 92 for temporary storage therein. The information contained in each of these buffers is maintained until subsequent transmissions from the computer peripheral to the pen-based computer 12 push previous signal information out of the buffer in a serial manner.

When the user of the pen-based computer would like to access the information stored in the data buffer, line status buffer or modem status buffer, a command is generated by the pen-based computer through the system call INT 14H. Respective information can be accessed by the user by either reading a data byte 94 from the data buffer 88, reading the line status 96 from the line status buffer 90 or reading the modem status 98 from the modem status buffer 92.

Each of the functions performed within the computer receptacle unit may be realized by using an EPROM contained within the computer receptacle unit as known in the art.

The above-described method of interfacing the pen-based computer, which transmits and control and data signals via an infrared port, with a computer peripheral, which communicates via an RS232-C type connector, is advantageous because the pen-based computer user can now simply connect to the appropriate computer peripheral to the computer receptacle unit when communication is desired. In addition, the method of the present invention filters out transmission errors which may occur during communication to and from the computer receptacle unit. As a result, the computer receptacle unit only provides correct data to the computer peripheral or the pen-based computer.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed:

1. A method of interfacing between a first data transmission system and a second data transmission system utilizing an interface mechanism, the first data transmission system having a first plurality of transceiver ports, the second data transmission system having a second plurality of transceiver ports, the method comprising the steps of:

a) generating an information signal including at least one of a data signal and a control signal within the first data transmission system, the data signal representing data to be provided by the first data transmission system, the control signal representing control commands to be provided by the first data transmission system for controlling communication between the interface mechanism and the second data transmission system;

b) compressing the at least one of a data signal and control signal within the first data transmission system to provide at least one of a data packet signal and control packet signal;

c) transmitting at least one of the data packet signal and the control packet signal to an interface mechanism;

d) decompressing the at least one of the data packet signal and control packet signal to provide at least one of a data information signal and a control information signal;

e) converting the at least one of a data information signal and control information signal to a format which is recognizable to the second data transmission system, the converted control information signal directly controlling communication between the interface mechanism and the second data transmission system; and f) providing the at least one of a data information signal and control information signal to the second data transmission system.

2. A method of interfacing between a first data transmission system and a second data transmission system as defined by claim 1 wherein step (b) further comprises:

setting a preferred data packet signal size for transmission;

providing a first data signal to a data packet signal buffer; and determining whether the first data signal is at least equal to the preferred data packet signal size, and if so, proceeding to the compression step, the determination substantially increasing transmission efficiency of the data packet signal.

3. A method of interfacing between a first data transmission system and a second data transmission system as defined by claim 2 further comprising:

providing a second data signal for combination with the first data signal if the first data signal is not at least equal to the preferred data packet signal size, the first and second data signals representing the data packet signal, the provision of the second data signal substantially increasing transmission efficiency of the data packet signal.

4. A method of interfacing between a first data transmission system and a second data transmission system as defined by claim 1 wherein step (b) further comprises:

setting a maximum time for a first data signal to remain in a data packet signal buffer;

providing a first data signal to the data packet signal buffer for temporary storage therein; and determining whether the first data signal has been stored in the data packet signal buffer for the maximum time, and if so, proceeding to the compression step, the determination substantially increasing transmission efficiency of the data packet signal.

5. A method of interfacing between a first data transmission system and a second data transmission system as defined by claim 4 further comprising:

providing a second data signal for combination with the first data signal if the first data signal has not been stored in the data packet signal buffer for the maximum time, the first and second data signals representing the data packet signal, the provision of the second data signal substantially increasing transmission efficiency of the data packet signal.

6. A method of interfacing between a first data transmission system and a second data transmission system as defined by claim 1 wherein prior to step (c), the method further comprising:

determining whether the interface mechanism is available to receive at least one of the data packet signal and the control packet signal.

7. A method of interfacing between a first data transmission system and a second data transmission system as defined by claim 1 wherein the first data transmission system includes an opto-electronic device capable of at least transmission of opto-electronic signals, and wherein step (c) further comprises:

transmitting the at least one of a data packet signal and control packet signal from the first transmission system to the interface mechanism with the opto-electronic device.

8. A method of interfacing between a first data transmission system and a second data transmission system as defined by claim 7 wherein the interface mechanism includes an opto-electronic device capable of at least reception of opto-electronic signals, and wherein step (c) further comprises:

receiving the at least one of a data packet signal and control packet signal with the opto-electronic device of the interface mechanism.

9. A method of interfacing between a first data transmission system and a second data transmission system as defined by claim 1 wherein step (c) further comprises:

providing a checksum signal from the first data transmission system to the interface mechanism, the checksum signal being indicative of the at least one of a data packet signal and control packet signal provided by the first data transmission system; and comparing the checksum signal with the at least one of a data packet signal and control packet signal.

10. A method of interfacing between a first data transmission system and a second data transmission system as defined by claim 9, wherein if the checksum signal is not indicative of the at least one of a data packet signal and control packet signal provided by the first data transmission system, the method further comprising:

retransmitting the at least one of the data packet signal and the control packet signal to the interface mechanism.

11. A method of interfacing between a first data transmission system and a second data transmission system as defined by claim 1, wherein prior to step (e), the method further comprising:

providing the at least one of the data packet signal and control packet signal to a data and control signal buffer for temporary storage therein.

12. A method of interfacing between a first data transmission system and a second data transmission system as defined by claim 1, wherein step (f) further comprises:

providing the data information signal and control information signal in RS232-C format to the second data transmission system.

13. A method of interfacing between a first data transmission system and a second data transmission system as defined by claim 1 wherein the control commands are indicative of a status change in at least one of a plurality of status signals utilized by the format which is recognizable to the second data transmission system.

14. A method of interfacing between a first data transmission system and a second data transmission system as defined by claim 13 wherein the plurality of status signals utilized are representative of an RS232-C format and include carrier detect (CD), data terminal ready (DTR), signal ground (GND), data set ready (DSR), request to send (RTS), clear to send (CTS) and ring indicator/+5V (RI/+5V).

15. A method of interfacing between a first data transmission system and a second data transmission system, the method utilizing an interface mechanism, the first data transmission system having a first plurality of transceiver ports, the second data transmission system having a second plurality of transceiver ports, the method comprising the steps of:

a) providing an information signal from the second data transmission system to the interface mechanism, the information signal including at least one of a data information signal, a control information signal, and a line status signal, the data information signal representing data to be provided by the second data transmission system, the control information signal being indicative of a communication status between the interface mechanism and the second data transmission system, and the line status signal being indicative of a transmission error between the interface mechanism and the second data transmission system;

b) compressing the information signal to provide a information packet signal;

c) transmitting the information packet signal from the interface mechanism to the first data transmission system; and d) decompressing the information packet signal to provide at least one of a data information signal, a control information signal and a line status signal.

16. A method of interfacing between a first data transmission system and a second data transmission system as defined by claim 15, the method further comprising:

providing the data information signal to a data buffer;

providing the control information signal to a modem status buffer; and providing the line status signal to a line status buffer.

17. A method of interfacing between a first data transmission system and a second data transmission system as defined by claim 15, the method further comprising:

accessing at least one of the data information signal, control information signal and line status signal to read at least one of information and status contained therein.

18. A method of interfacing between a first data transmission system and a second data transmission system as defined by claim 15 wherein the interface mechanism includes an opto-electronic device capable of at least transmission of opto-electronic signals, and wherein step (c) further comprises:

transmitting the information packet signal from the interface mechanism to the first data transmission system with the opto-electronic device.

19. A method of interfacing between a first data transmission system and a second data transmission system as defined by claim 18 wherein the first data transmission system includes an opto-electronic device capable of at least reception of opto-electronic signals, and wherein step (c) further comprises:

receiving the information packet signal with the opto-electronic device of the first data transmission system.

20. A method of interfacing between a first data transmission system and a second data transmission system as defined by claim 15, wherein step (c) further comprises:

providing a checksum signal from the interface mechanism to the first data transmission system, the checksum signal being indicative of the information packet signal provided by the interface mechanism; and comparing the checksum signal with the information packet signal.

21. A method of interfacing between a first data transmission system and a second data transmission system as defined by claim 20, wherein if the checksum signal is not indicative of the information packet signal, the method further comprising:

retransmitting the information packet signal to the first data transmission system.

22. A method of interfacing between a first data transmission system and a second data transmission system as defined by claim 15, wherein step (a) further comprises:

providing the information signal from the second data transmission system to the interface mechanism in RS232-C format.

23. A method of interfacing between a first data transmission system and a second data transmission system as defined by claim 15, wherein step (a) further comprises:

providing the information signal to an information signal buffer for temporary storage therein.

\* \* \* \* \*